Feb. 5, 1935.    V. TONCICH    1,990,212
SHAFT COUPLING FOR AUTOMATICALLY VARIABLE SPEED
RATIOS, PARTICULARLY FOR MOTOR CARS
Filed April 21, 1933    2 Sheets-Sheet 1

Inventor:
Victor Toncich

Patented Feb. 5, 1935

1,990,212

UNITED STATES PATENT OFFICE 1,990,212

SHAFT COUPLING FOR AUTOMATICALLY VARIABLE SPEED RATIOS, PARTICULARLY FOR MOTOR CARS

Victor Toneich, Lins-Noroeste, Brazil

Application April 21, 1933, Serial No. 667,289
In Austria April 13, 1932

8 Claims. (Cl. 74—294)

This invention relates to a speed controlled clutch of the kind wherein an automatic change in the transmission ratio is obtained through the medium of centrifugal governors, and the invention consists broadly in the employment of two centrifugal governors which co-operate with the controlling member of a slip clutch and which are in operative connection, one with the driving shaft and the other with the driven shaft.

By this arrangement the advantage is obtained that a rapid tightening of the clutch will be effected after the driven shaft has commenced to move, and also that the clutch will be more than ordinarily yieldable on an increase in the load, since then the tightness of the clutch will be reduced by the governor connected to the driven shaft.

Fig. 1 of the accompanying drawings represents a sectional view of a clutch according to the invention;

Figure 1:
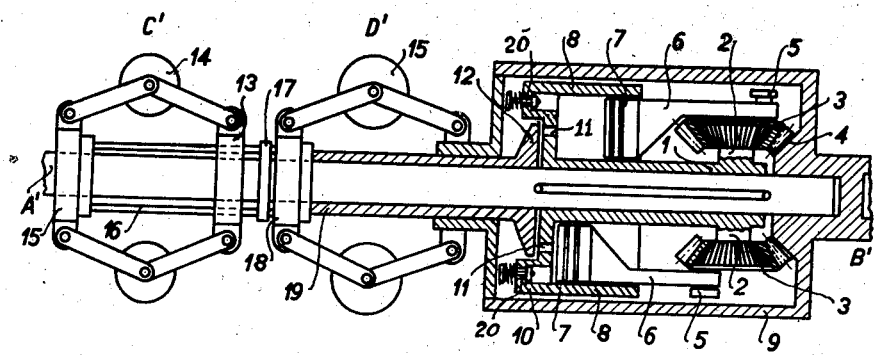
Figure 3:
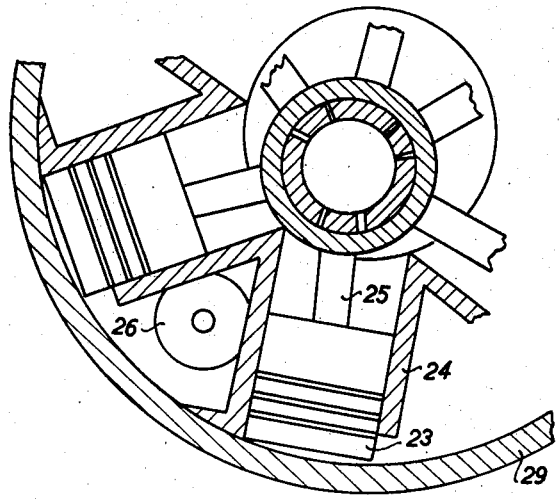
Fig. 3 is a fragmentary section of the latter clutch taken at right angles to Fig. 2.

In the construction shown in Fig. 1, a sleeve 1 is rigidly connected to the shaft A' and provided with outwardly extending pins 2 on which are rotatably mounted bevel wheels 3, which mesh with a bevel wheel 4 fixed to the driven shaft. The piston rods 6 of the pistons 7, operating in the cylinders 8, engage crank pins 5 of the bevel wheels 3. The cylinders 8 are rigidly connected with the sleeve 1. Preferably two or more bevel wheels 3 and pumps 7, 8 are employed. The bevel wheel 4 is integral with a casing 9, enclosing the entire coupling arrangement and filled with liquid. The cylinder heads 10 are provided with ports 11 for the outlet of the liquid displaced by the pistons. A closure member 12 is disposed opposite said ports and is slidably mounted on the driving shaft A'.

The cover 12 is carried by a sleeve 19 which surrounds the driving shaft and which projects through the casing 9. A centrifugal governor D' is in operative connection with the driven shaft through the casing 9 and has a sliding collar 18 which moves on the driving shaft and which is adapted to act on the sleeve 19 for closing the ports 11 on the balls 15 being spread out by centrifugal action. Another centrifugal governor C' is in operative connection with the driving shaft to which it is secured by means of a collar 13. The sliding collar 15' of the governor C' is connected by rods 16 to a ball thrust bearing 17 through the medium of which it exerts pressure on the collar 17 of the governor D' when the balls 14 are spread out by centrifugal action.

The arrangement operates in the following manner: When the shaft A' is rotated, the bevel wheels 3 idly rotate on the bevel wheel 4, which at first is immovable in view of the moment of resistance tending to arrest the shaft B', and drive the pistons 7 by means of the crank pins 5 and piston rods 6. Therefore the pistons, during their movement towards the open ends of the cylinders 8, draw in liquid from the casing 9 through spring-loaded valves 20 arranged in the cylinder heads 10 and during their return movement force out the liquid through the ports 11, which takes place without any obstruction whatever as long as no throttling is effected by the closure member 12. Thus the rotation of the bevel wheels 3 is not hampered by a resistance on the part of the pump 7, 8 and therefore the bevel wheels 3 do not cause the rotation of the bevel wheel 4 and of the shaft B'. However if the ports 11 are shut gradually by the closure member 12 in response to the action of one or both centrifugal governors C', D' thereby throttling the discharge of liquid, the speed of rotation of the bevel wheels 3 is reduced owing to the moment of resistance exerted on their crank pins 5 by the pistons 7, and now the shaft A' exerts a corresponding moment of rotation on the bevel wheel 4 of the shaft B'. If the ports 11 are closed entirely by the closure member 12, the operation of the pistons within the cylinders 8 is stopped owing to the impossibility of compressing the liquid, therefore the bevel wheels are immovable with respect to the driving shaft A' and the coupling is rigid between both shafts.

On rotation of the shaft A', the bevel wheels 3 are braked in view of the action of the centrifugal governor C' and the shaft B' is gradually set in rotation without shocks or jerks. The centrifugal governor D' then also becomes effective and increases the degree of coupling by increased throttling of the liquid-circulation and obstruction of the piston-movement. Given suitable dimensions and adjustment it is possible to produce for instance the condition of rigid coupling, when the driven shaft at full speed transmits its normal moment of torsion. However if the moment of resistance of this shaft increases further, its speed and thus also the pressure exerted by its centrifugal governor D' on the throttle are reduced, so that the coupling becomes yielding and transmits a reduced turning moment, and a new state of equilibrium with a different speed ratio is established automatically.

Figure 2:
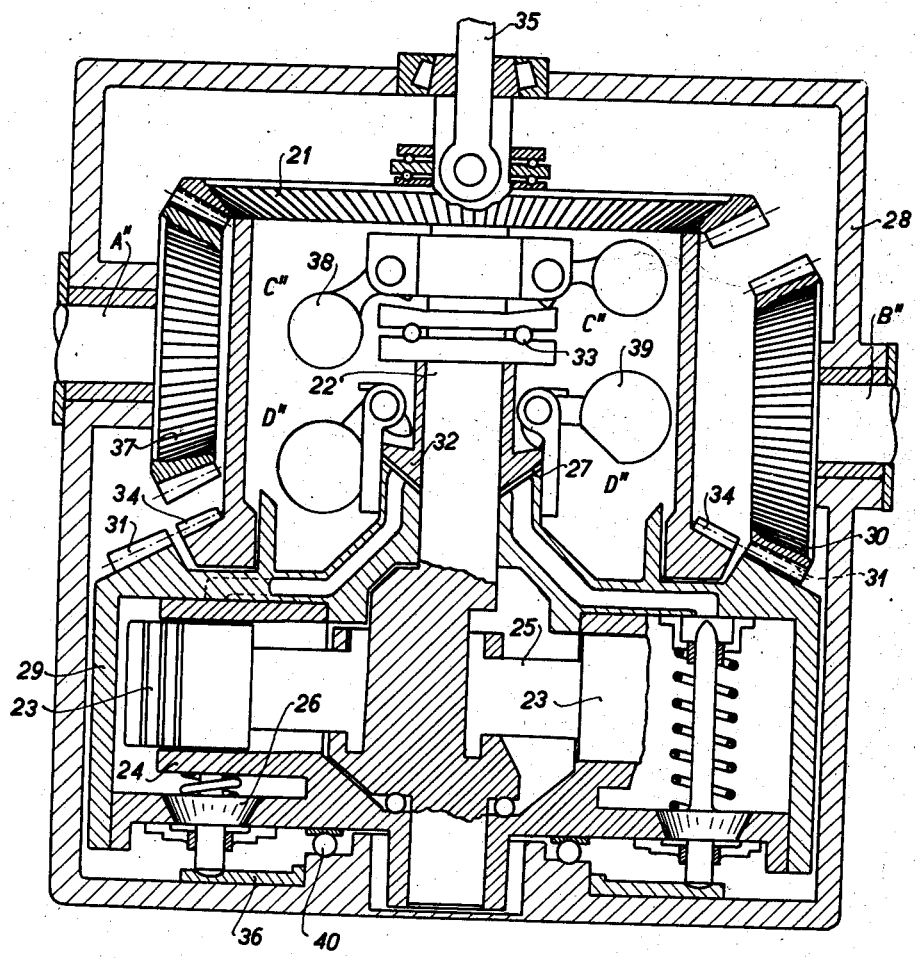
Fig. 2 is a sectional view of a modified form of the clutch.

In the construction shown in Fig. 2, the shaft A'' operates the pistons 23 in the cylinders 24 by means of the bevel wheels 37, 21, the crank shaft 22 and the piston rods 25. As long as the liquid drawn in by the pistons from the casing 28 by way of the spring-loaded valves 26 returns unobstructed through the passages 27, the casing 29, containing the cylinders and carrying a bevel toothed rim 31 adapted to mesh with a bevel wheel 30 on the shaft B'', is not disturbed from its position of rest. However if the passages 27 be shut by the closure member 32 and consequently the pistons arrested in the cylinders, the entire turning moment of the shaft A'' is transmitted to the shaft B''.

The axial movement of the closure member 32 is effected by the centrifugal governors C'' and D''. The centrifugal governor C'' is rigidly connected with the crank shaft 22 and, during the outward movement of its balls 38, subjects the rolling bearing 33 and thus also the slidable closure member 32 to an axial pressure. At the same time the centrifugal governor D'' is connected with the cylinder-casing 29 and consequently with the shaft B'' and, during the outward movement of its balls 39, directly operates the closure member 32 in the direction of closing the passages 27.

In order to prevent the sucking in of liquid through the passages 27 by the action of the pistons, the channels leading thereto are preferably closed automatically and simultaneously with the opening of the spring-loaded suction valves 26.

Thus the arrangement shown in Fig. 2 operates substantially in the same way as the arrangements illustrated in Fig. 1. The speed of the shaft A'' increases so that its centrifugal governor C'' compensates the reduction in the axial pressure of the centrifugal governor on the shaft B'', in the event of the resistance of the shaft B'' being so increased that its speed is reduced and its throttling action weakened owing to the decreasing effect of the centrifugal governor D''. Thus both shafts are adjusted automatically to the speed corresponding to the moment of resistance to be overcome.

In order to adapt the construction according to Fig. 2 for reversing, the bevel wheel 21 is provided with a second bevel wheel 34 which can be placed into mesh with the bevel wheel 37 by axially shifting the wheel 21 by means of the lever 35.

All valves can be lifted and held open simultaneously by lifting of the ring 36, in which case the whole gear operates without any internal resistance.

It is of advantage to make the centrifugal governors associated with the driven shaft heavier than the centrifugal governors associated with the driving shaft, in order that they still act on the throttle even when the speed of the former has been reduced considerably.

What I claim is

1. A centrifugally controlled fluid clutch comprising in combination a casing, a driving shaft, a driven shaft, a supply of fluid in the said casing, pumping means driven by the said driving shaft and adapted to circulate the said fluid, outlets in the said means, a closure member adapted to control the flow through the said outlets, transmission gearing between the said means and the said driven shaft, a centrifugal governor associated with the said driving shaft and adapted to act upon the said closure member, and a centrifugal governor associated with the said driven shaft and likewise adapted to act upon the said closure member, the total revolving mass of the said centrifugal governor associated with the driven shaft being of greater weight than the total revolving mass of the said governor associated with the driving shaft.

2. A centrifugally controlled fluid clutch as claimed in claim 1 in which the said closure member comprises a sleeve slidable on the said driving shaft and a flange portion on the said sleeve adapted to close and disclose the said outlets, and in which the said governors are mounted in juxtaposition on the said driving shaft.

3. A centrifugally controlled fluid clutch as claimed in claim 1 in which the said governors are provided with sliding collars and in which the collar of the driving shaft governor carries an anti-friction thrust bearing and is adapted to act by means of the said bearing on the collar of the driven shaft governor, so that the action of the said governors is additive.

4. A centrifugally controlled fluid clutch as claimed in claim 1 in which the said driven shaft is integral with the said casing, and the said transmission gearing comprises a sun gear wheel attached to the said casing and planet wheels connected to the moving parts of the said pumping means.

5. A centrifugally controlled fluid clutch as claimed in claim 1 in which the said pumping means comprise a housing, cylinders in the said housing, and pistons adapted to travel in the said cylinders, and in which the said outlets are provided in the said housing at the head of each of the said cylinders.

6. A centrifugally controlled fluid clutch as claimed in claim 1, further comprising an intermediate driving shaft for the said pumping means disposed substantially at right angles to the said clutch driving shaft, the said closure member and centrifugal governors being mounted on the said intermediate driving shaft, bevel transmission gearing between the said driving shaft and intermediate driving shaft, inlet apertures in the said pumping means, spring-loaded valves controlling the said inlet apertures, and means for automatically closing the said outlets in dependence on the opening of the said valves.

7. A centrifugally controlled fluid clutch as claimed in claim 1, further comprising an intermediate driving shaft for the said pumping means disposed substantially at right angles to the said clutch driving shaft, the said closure member and centrifugal governors being mounted on the said intermediate driving shaft, bevel transmission gearing between the said clutch driving shaft and intermediate driving shaft, means for reversing the direction of rotation of the said intermediate driving shaft relatively to the said clutch driving shaft, inlet apertures in the said pumping means, spring-loaded valves controlling the said inlet apertures, and means for automatically closing the said outlets in dependence on the opening of the said valves.

8. A centrifugally controlled fluid clutch as claimed in claim 1, further comprising an intermediate driving shaft for the said pumping means disposed substantially at right angles to the said clutch driving shaft, the said closure member and centrifugal governors being mounted on the said intermediate driving shaft, bevel transmission gearing between the said clutch driving shaft and intermediate driving shaft, means for reversing the direction of rotation of the said intermediate driving shaft relatively to the said clutch driving shaft, inlet apertures in the said pumping means, spring-loaded suction valves controlling the said inlet apertures, means for automatically closing the said outlets in dependence on the opening of the said valves, means for lifting the said valves simultaneously, and hand operating means for actuating the said reversing means and valve-lifting means.

VICTOR TONCICH.